(12) United States Patent
Thomas

(10) Patent No.: US 6,463,845 B1
(45) Date of Patent: Oct. 15, 2002

(54) DEVICE FOR MAKING CREAM-STYLE CORN

(76) Inventor: John L. Thomas, 1101 Coliseum Ave., Live Oak, FL (US) 32060

( * ) Notice: Subject to any disclaimer, the term of this patent is extended or adjusted under 35 U.S.C. 154(b) by 0 days.

(21) Appl. No.: 09/689,149

(22) Filed: Oct. 12, 2000

Related U.S. Application Data

(60) Provisional application No. 60/159,787, filed on Oct. 15, 1999.

(51) Int. Cl.$^7$ ................................................ A23N 15/02
(52) U.S. Cl. ............................ 99/514; 99/567; 99/586; 99/589; 99/595; 460/45; 460/51; 83/167; 83/267; 83/733; 83/932
(58) Field of Search ........................ 99/567, 514, 574, 99/575, 580, 589, 586, 590, 594–599; 460/45, 46, 49, 58, 56, 51; 83/161, 167, 178, 508, 932, 267, 733, 444; 82/173, 113, 128, 130

(56) References Cited

U.S. PATENT DOCUMENTS 240,052 A  *  4/1881  Stover
1,127,548 A  *  2/1915  Turner
2,063,483 A  *  12/1936  Bulmer ........................... 130/9
2,326,873 A  *  8/1943  Meek .............................. 146/4
5,097,758 A  *  3/1992  Fresh ............................ 99/590
6,305,276 B1 * 10/2001  Backus ......................... 99/514

* cited by examiner

Primary Examiner—Keith Hendricks
Assistant Examiner—Drew Becker
(74) Attorney, Agent, or Firm—Thomas, Kayden, Horstemeyer & Risley, LLP

(57) ABSTRACT

A preferred device for making cream-style corn includes a corn-receiving member and a blade member. The corn-receiving member incorporates a first open end and defines an interior that is configured to receive at least a portion of an ear of corn. The blade member includes a blade that is movably mounted within the interior so as to be movable between a retracted position and an extended position. In the extended position, the blade is configured to engage an ear of corn inserted into the interior of the corn-receiving member so that, as the ear of corn is rotated about its longitudinal axis, the blade tears open individual kernels of the ear of corn and allows liquid and fibrous contents of the kernels to drain into the corn-receiving member. Systems and methods also are provided.

20 Claims, 4 Drawing Sheets

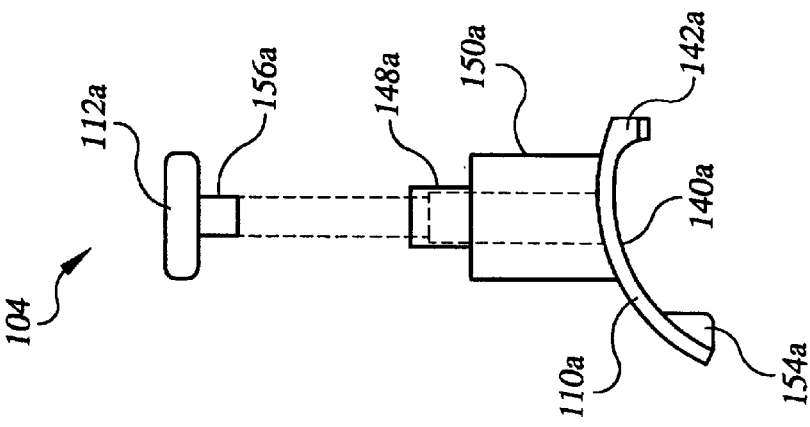
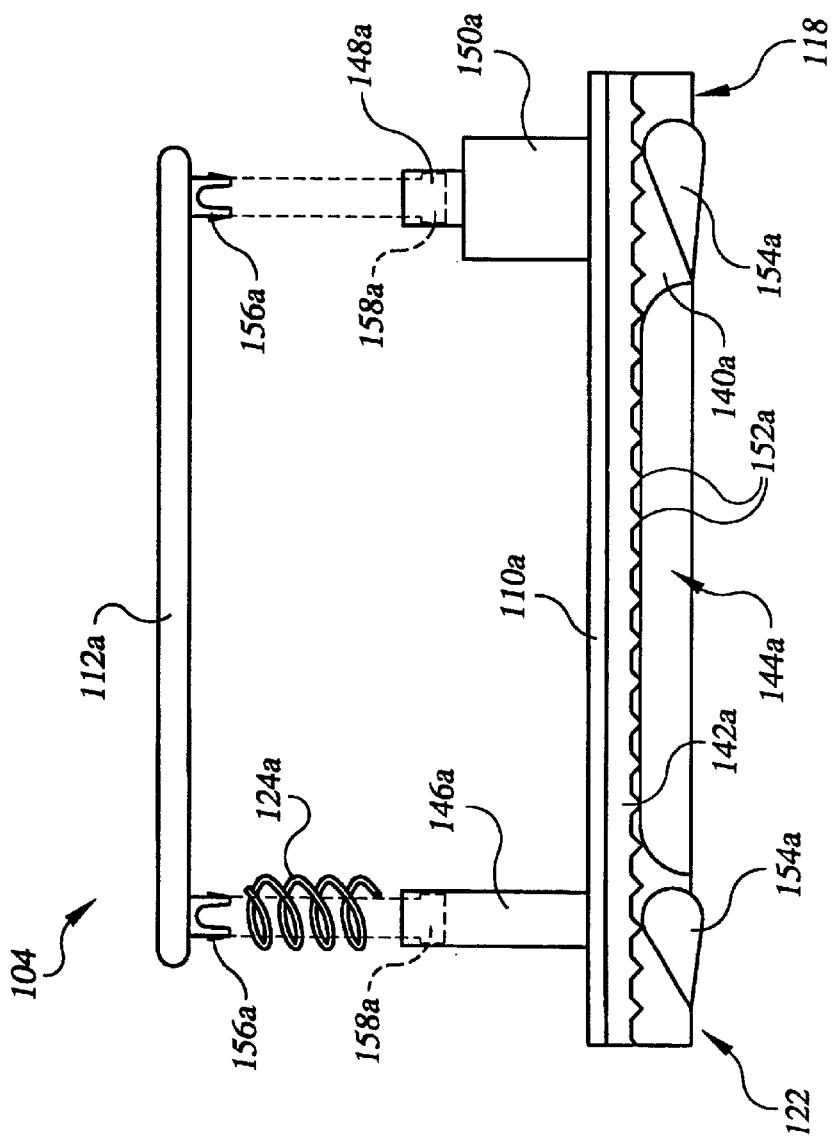

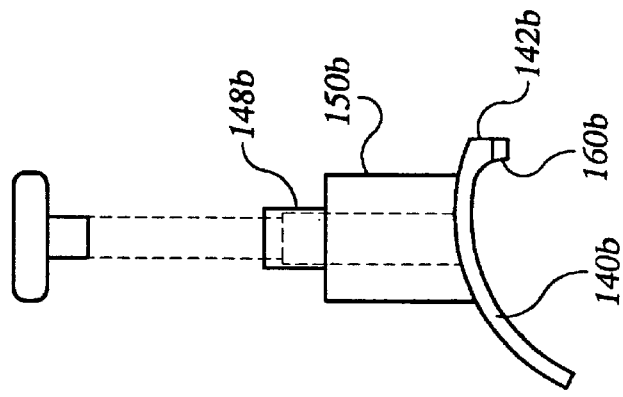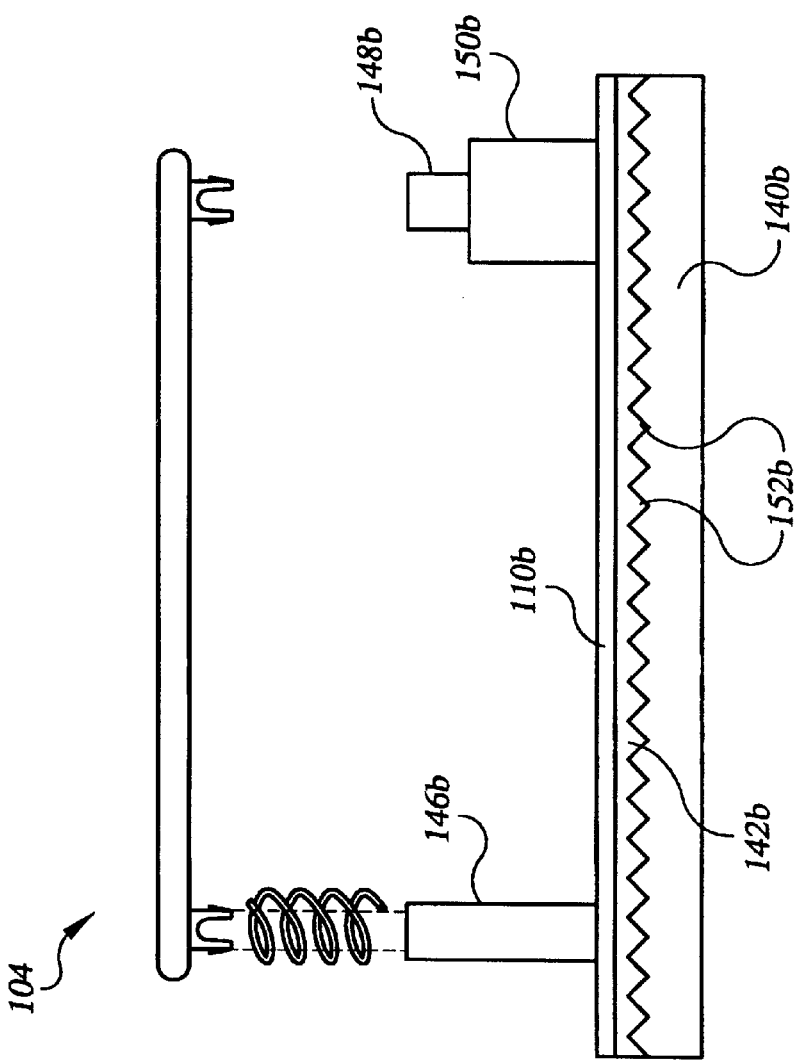

US 6,463,845 B1

DEVICE FOR MAKING CREAM-STYLE CORN

This application claims the benefit of 60/159,787, filed Oct. 15, 1999.

BACKGROUND OF THE INVENTION

Field of the Invention

The present invention generally relates to food processing and, in particular, to devices, systems and methods for making cream-style corn.

BACKGROUND OF THE INVENTION

As is known, vegetables may be prepared in numerous manners for presentation at a meal. For instance, corn may be cooked and presented with the kernels remaining attached to a cob (otherwise known as "corn-on-the-cob"), the kernels may be cut from the cob and then cooked, etc. Of particular interest, however, is a style of presenting corn known as "cream-style corn" or, merely, "cream corn."

Conventionally, cream-style corn is formed of the hearts or interior matter of multiple kernels of corn. So formed, cream-style corn may vary in consistency or texture between being soup-like, which generally is not highly regarded, to grit-like, which generally is a more highly sought after texture. Typically, the interior matter is encased by the exterior skins of the kernels and may include liquids as well as fibrous solids. During preparation, the kernels are ruptured, such as by piercing the exterior skins of the kernels, so as to allow the interior matter to exude from the kernels. Heretofore, however, such preparation typically has been performed by industrial food preparation processes and has met with little success on a smaller scale.

Therefore, there is a need for improved devices, systems and methods that address these and other shortcomings of the prior art.

SUMMARY OF THE INVENTION

Briefly described, the present invention relates to devices, systems and methods for making cream-style corn. In this regard, a preferred embodiment of a device for making cream-style corn includes a corn-receiving member and a blade member. The corn-receiving member incorporates a first open end and defines an interior that is configured to receive at least a portion of an ear of corn. The blade member includes a blade that is movably mounted within the interior so as to be movable between a retracted position and an extended position. In the extended position, the blade is configured to engage an ear of corn inserted into the interior of the corn-receiving member so that, as the ear of corn is rotated about its longitudinal axis, the blade tears open individual kernels of the ear of corn and allows liquid and fibrous contents of the kernels to drain into the corn-receiving member.

A preferred system embodiment for making cream-style corn includes a corn creamer that incorporates a corn-receiving member and a blade member. Additional features, such as a container for receiving liquid and fibrous contents of kernels draining from the corn-receiving member, for example, may be provided.

Some embodiments of the present invention also may be construed as providing methods for making cream-style corn. A preferred such method includes the steps of: rotating an ear of corn about a longitudinal axis thereof; and engaging the ear of corn with a cutting member having a plurality of teeth. Preferably, each of the teeth are configured to rupture a kernel of corn so that liquid and fibrous contents of the kernels drain from the ear of corn.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

FIG. 3A is a partially-exploded, side view of a preferred embodiment of the present invention.

FIG. 3B is an end view of the embodiment depicted in FIG. 3A.

FIG. 4A is a partially-exploded, side view of an alternative embodiment of the present invention.

FIG. 4B is an end view of the embodiment depicted in FIG. 4A.

DETAILED DESCRIPTION OF A PREFERRED EMBODIMENT

Figure 1:
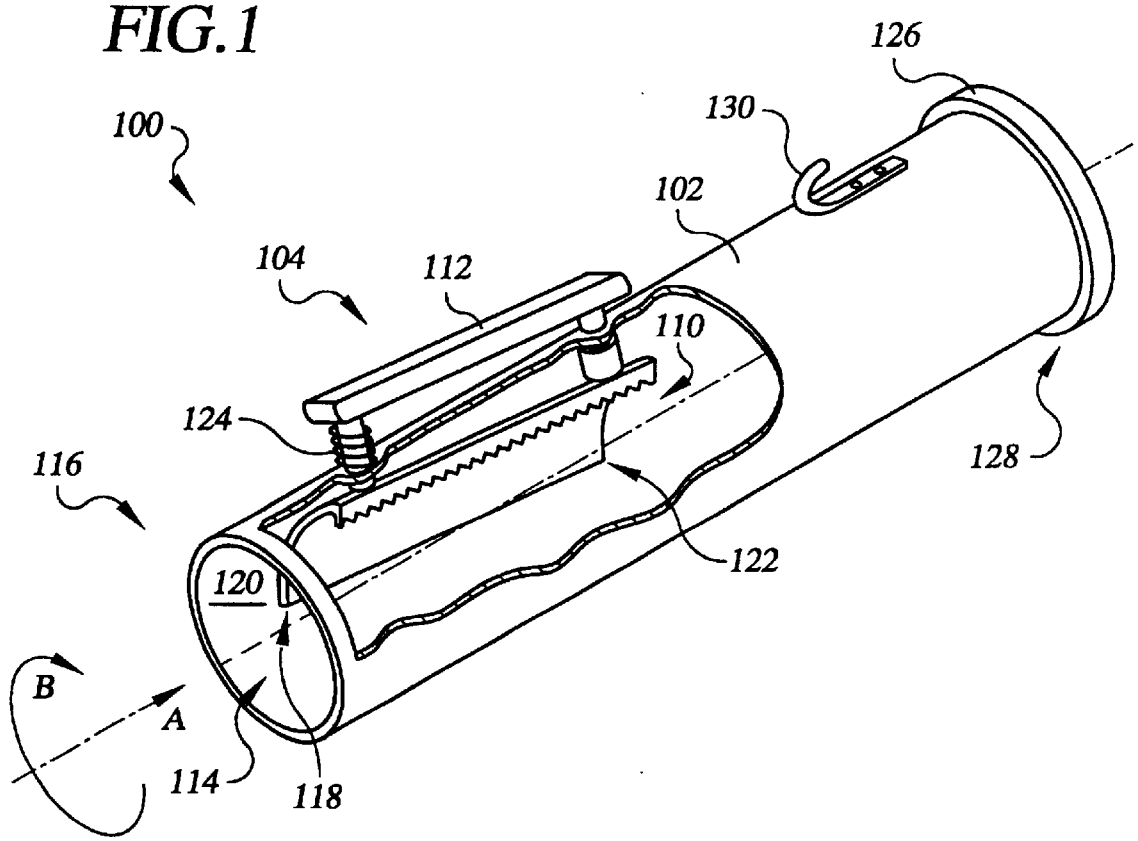
FIG. 1 is a partially cut-away, perspective view of a preferred embodiment of the present invention showing detail of a cutting blade.

Reference will now be made to the drawings wherein like numerals indicate corresponding parts throughout the several views. As shown in FIG. 1, a preferred embodiment of the corn creamer 100 of the present invention incorporates a corn-receiving member 102 and a blade member 104. The corn-receiving member 102 may be configured in numerous manners, such as tubular, among others, provided that the corn-receiving member is adapted to receive, at least partially therein, an ear of corn. The corn-receiving member may be formed from numerous materials, such as PVC, for instance, and preferably is configured with a sufficient diameter and length for receiving an entire ear of corn therein.

Blade member 104 includes a blade 110 and a handle 112. Blade member 104 engages the corn-receiving member so that the blade 110 is mounted within the interior 114 of the corn-receiving member and the handle 112 is mounted at the exterior of the corn-receiving member. For example, the blade member as well as the blade 110 may be mounted adjacent to the proximal end 116 of the corn-receiving member. Preferably, when so mounted, the blade 110 is inclined relative to a longitudinal axis of the corn-receiving member, when in the retracted or inoperative position depicted in FIG. 1. So mounted, the proximal end 118 of the blade (the proximal end of the blade resides adjacent to the proximal or entrance end of the corn-receiving member) preferably is positioned in close proximity to the interior side wall 120 of the corn-receiving member and the distal end 122 of the blade is positioned at a spaced interval from the interior side wall 120. As depicted in FIG. 1, a biasing member 124, such as a spring, for example, may be utilized for urging the proximal end 118 of the blade toward its retracted position.

Corn-receiving member 102 may incorporate one or more protrusions, such as an end ring 126, provided at the distal or exit end 128 of the corn-receiving member. Preferably, the end ring protrudes as a flange-like member about the exterior of the exit end and may facilitate engagement of the exit end with a storage bag (shown and described hereinafter). For instance, the open end of a storage bag may be received about the distal end of the corn-receiving member and then gathered and secured about the end ring, such as by a rubber band, thereby securing the bag to the corn-receiving member. So provided, the bag may be utilized to receive liquid and fibrous contents of corn kernels exuded during processing.

Additionally, a stabilizing member 130, such as a hook, for example, may be provided on the exterior of the corn-receiving member to facilitate a more secure positioning of the corn-receiving member during processing, e.g., when receiving a rotating ear of corn. The stabilizing member may be provided in numerous configurations for engaging various items-and/or surfaces during processing. During such processing, an ear of corn may be received within the corn-receiving member by aligning the ear of corn with the proximal or open end of the corn-receiving member and then moving the ear of corn in direction A. The ear of corn also may be rotated in direction B, as described in detail hereinafter.

Figure 2:
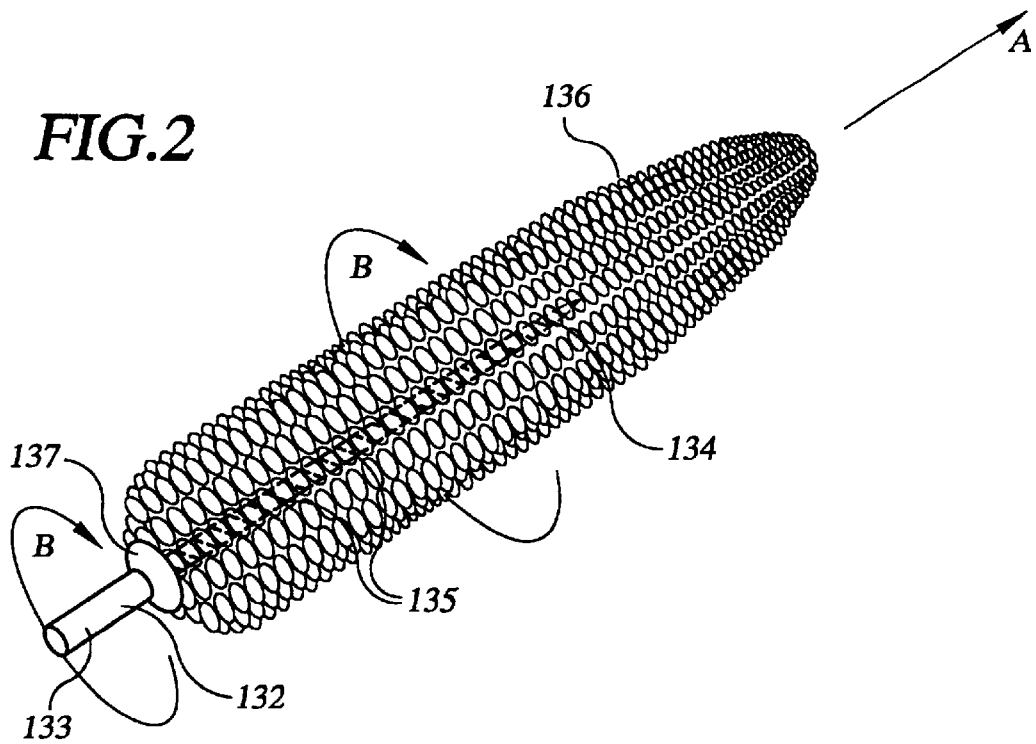
FIG. 2 is a perspective view of a preferred embodiment of a corn mount depicted mounted within a representative ear of corn.

As depicted in FIG. 2, a corn mount 132 also may be provided which preferably incorporates a first end 133, which is adapted for engaging a rotary device, such as a drill, for example, and a second end 134, which preferably is configured with external threads 135 so that the second end may be anchored within the cob of an ear of corn, such as representative ear of corn 136. Preferably, corn mount 132 is inserted into the ear of corn 134 so that the corn mount aligns, e.g., aligns co-extensively, with the longitudinal axis of the ear of corn. The corn mount also may include a stop 137, positioned between the first and second ends, which is provided for preventing the corn mount from burrowing too deeply within an ear of corn. So positioned, the first end of the corn mount may engage a standard drill (not shown), for example, thereby providing the ear of corn with a rotation about its longitudinal axis, e.g., in direction B.

Referring now to FIGS. 3A and 3B, a preferred embodiment of the blade member 104 will be described in greater detail. As depicted in FIG. 3A, blade 110a preferably is configured as a generally arcuate structure, when viewed from its end (see, FIG. 3B), and includes a generally smooth corn-engaging inner surface 140a and a cutting member 142a. The corn-engaging inner surface 140a preferably is configured as a generally rectangular-shaped member, when viewed from the top. In some embodiments, such as the embodiment depicted in FIG. 3A, a cut-out portion 144a may be defined along a side edge of the blade, e.g., the side edge of the blade opposing the cutting member. The corn-engaging inner surface 140a also includes first and second mounting posts, 146a and 148a, respectively, for engaging the handle 112a. Preferably, the first and second mounting posts are adapted to extend through orifices formed through the corn-receiving member (see, FIG. 1). Additionally, the second mounting post may incorporate a spacer 150a, preferably formed with a diameter greater than its respective orifice, so that engagement of the first and second posts within the orifices tends to displace the blade in an inclined arrangement relative to the longitudinal axis of the corn-receiving member. So arranged, the blade 110a is appropriately positioned for receiving an ear of corn, as described hereinbefore.

Cutting member 142a preferably engages a side edge of the corn-engaging inner surface 140a and is formed with a series of teeth 152a, such as triangular-shaped teeth, which are provided at spaced intervals along a length of the blade. Additionally, one or more guides 154a may be provided. Preferably, the guide(s) 154a extend inwardly from the corn-engaging inner surface 140a and are tapered inwardly from the proximal end 118 of the blade to the distal end 122 of the blade. It has been determined that the guide(s) may perform one or more of the following functions: positioning of an ear of corn relative to the longitudinal axis of the corn-receiving member; urging the ear of corn into engagement with the cutting member; and/or facilitating convenient extraction of an ear of corn from the corn-receiving member after processing (non-tapered guides may actually form a groove about the ear of corn during processing that may snag upon one or more surfaces of the blade member during extraction).

As depicted in FIGS. 3A and 3B, the handle may be formed as a generally rectangular-shaped member and preferably incorporates means for securely engaging the blade member. For example, latching members 156a preferably are provided on the handle and are utilized for engaging within bores 158a formed within the first and second posts of the blade member, for instance, thereby securing the handle to the blade member with an interference fit. Securing the handle to the blade member in the aforementioned manner also facilitates positioning and securing of biasing member 124a (not shown in FIG. 3B) between the handle and the exterior surface of the corn-receiving member (see, FIG. 1).

Referring now to FIGS. 4A and 4B, an alternative embodiment of the blade member 104 will be described in greater detail. As depicted in FIG. 4A, blade 110b preferably is configured as a generally arcuate structure, when viewed from its end (see, FIG. 4B), and includes a generally smooth corn-engaging inner surface 140b and a cutting member 142b. The corn-engaging inner surface 140b preferably is configured as a generally rectangular-shaped member, when viewed from the top. The corn-engaging inner surface 140b also includes first and second mounting posts, 146b and 148b, respectively, which perform functions similar to those described in relation to posts 146a and 148b of FIGS. 3A and 3B.

Cutting member 142b preferably engages a side edge of the corn-engaging inner surface 140b and is formed with a series of teeth 152b, such as triangular-shaped teeth. Preferably, the teeth include inclined faces 160b so as to portray a sloped profile, when viewed from the end (see, FIG. 4B). The aforementioned configuration of the teeth has been found to appropriately engage a rotating ear of corn in such a manner as to remove the liquid contents of the various kernels of the corn without removing a large amount of the unwanted fibrous contents of the kernels.

Operation

Figure 5:
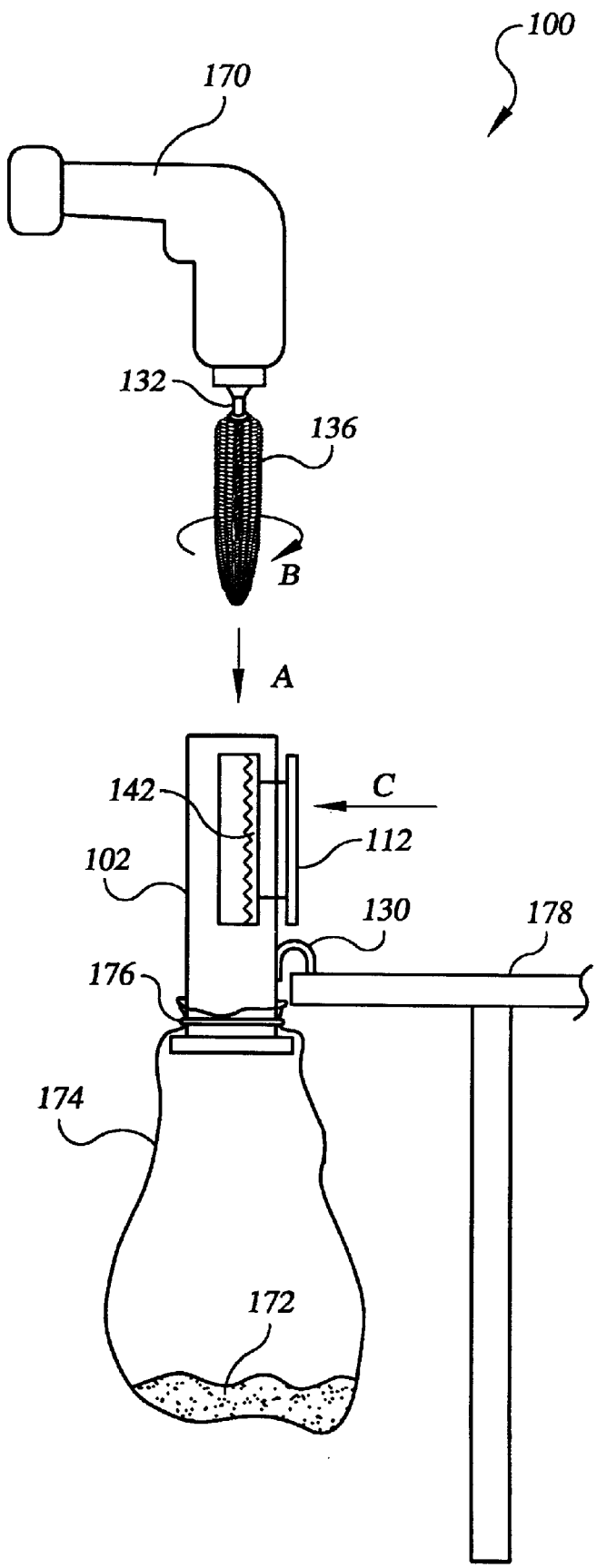
FIG. 5 is a schematic diagram depicting preparation of cream-style corn while utilizing a preferred embodiment of the present invention.

As depicted in the schematic diagram of FIG. 5, operation of the corn creamer 100 is facilitated by inserting a first end of a corn mount 132 within a rotary device 170, such as a drill, and burrowing the second end of the corn mount into an ear of corn 136. The mounted and, preferably, rotating ear of corn, e.g., rotating in direction B, may then be inserted, such as by moving the ear of corn in direction A, within the entrance end of the corn-receiving member. Simultaneously, or nearly so, the handle 112 of the blade member 104 may be depressed, e.g., displaced in direction C, against the exterior surface of the corn-receiving member. Depressing of the handle in this manner positions the blade within the interior of the corn-receiving member, e.g., to its extended position, so that the blade may engage the ear of corn. As the ear of corn is inserted more deeply within the corn-receiving member, the exterior of the ear of corn may tend to urge the blade to an intermediate position; however, typically, the blade, and more specifically, the cutting member 142 of the blade, remains in contact with the corn.

The configuration of the corn creamer, described hereinbefore, tends to tear open the individual kernels of the ear of corn as the kernels engage the blade and allows the liquid and fibrous contents 172 of each of the kernels to drain into the interior of the corn-receiving member. The contents then tend to drain toward the exit end of the corn-receiving member since the corn-receiving member typically is downwardly inclined so that the contents may be collected in a container 174, such as a plastic storage bag, for example. For instance, a plastic bag may be received about the distal or exit end of the corn-receiving member and then a tie 176, such as a rubber band, for example, may be engaged about the bag for retaining the bag at the exit end.

Once appropriately processed by the corn creamer, the processed ear of corn may be removed from the corn-receiving member. As depicted, the corn-receiving member may be stabilized during processing by engaging the stabilizing member 130 against a suitable surface 178, such as a table top, for example. Additional ears of corn may then be processed by repeating the aforementioned processing steps. Once a suitable number of ears of corn have been processed, the container, e.g., storage bag, and the contents collected therein may be removed from the corn-receiving member.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A device for making cream-style corn comprising:
    a corn-receiving member shaped as an elongated tube and having a first open end and an inner wall, said inner wall defining an interior, said first open end communicating with said interior, said interior being configured to receive therein at least a portion of an ear of corn; and
    a blade member having a blade and a handle, said blade being movably mounted within said interior of said corn-receiving member, said handle being movably mounted at an exterior of said corn-receiving member, said blade being configured to move with said handle such that movement of said handle moves said blade,
    said blade having an elongate inner corn-receiving surface and a cutting member, said inner corn-receiving surface being defined by first and second side edges and first and second ends, said inner corn-receiving surface being curved as viewed from either of said first and second ends, said cutting member extending from said first side edge of said inner corn-receiving surface, said cutting member having teeth for tearing open individual kernels of an ear of corn,
    said blade being movable between a retracted position and an extended position, in said extended position said blade being configured to engage an ear of corn inserted into said interior and trap the ear of corn between said blade and said inner wall such that, as the ear of corn is rotated about a longitudinal axis within said interior, said blade tears open individual kernels of the ear of corn and allows liquid and fibrous contents of the kernels to drain into said interior of said corn-receiving member.

2. The device of claim 1, wherein, in said retracted position, said blade member is inclined with respect to a longitudinal axis of said corn-receiving member such that said first end of said blade is located closer to said inner wall than is said second end of said blade.

3. The device of claim 2, wherein said first end of said blade is located closer to said first open end of said corn-receiving member than is said second end of said blade.

4. The device of claim 2, wherein said blade member has first and second mounting posts, and said corn-receiving member has first and second apertures formed therethrough, each of said first and second mounting posts being attached between said blade and said handle, said first mounting post extending through said first aperture, said second mounting post extending through said second aperture.

5. The device of claim 4, further comprising:
    a biasing member arranged between the exterior of said corn-receiving member and a portion of said handle, said biasing member biasing said blade to said retracted position.

6. The device of claim 5, wherein said biasing member is a spring coiled about said first mounting post.

7. The device of claim 6, further comprising:
    a container sized and shaped to receive liquid and fibrous contents of kernels of corn from said corn-receiving member; and
    wherein said corn-receiving member has a second open end and a first protrusion extending outwardly from said exterior of said corn-receiving member at a location closer to said second open end than said first open end, said second open end communicating with said interior, said first protrusion being configured to receive thereabout said container for receiving the liquid and fibrous contents of the kernels draining from said corn-receiving member via said second open end.

8. The device of claim 1, wherein said corn-receiving member has a stabilizing member affixed thereto, said stabilizing member extending outwardly from an exterior surface of said corn-receiving member and being shaped as a hook to engage a surface such that, as an ear of corn is inserted into said corn-receiving member and rotated therein, engagement of said stabilizing member with the surface tends to stabilize said corn-receiving member.

9. The device of claim 1, wherein said corn-receiving member has a second open end opposing said first open end; and
    wherein said corn-engaging inner surface has a guide protruding therefrom, said guide being tapered, and having a first end and a second end, said first end sloping outwardly from said first open end to said second open end of said corn-receiving member such that an ear of corn inserted into said first end is directed into alignment with said blade by engagement with said first end of said guide.

10. The device of claim 1, wherein said corn-receiving member is cylindrical.

11. The device of claim 10, wherein said corn-receiving member is formed of a length of PVC tubing.

12. The device of claim 1, wherein at least some of said teeth are triangular as viewed from said first side of said blade.

13. The device of claim 1, wherein at least some of said teeth include inclined rear faces, said inner corn-receiving surface of said blade being smoothly curved to blend with said inclined rear faces.

14. A device for making cream-style corn comprising:

a corn-receiving member shaped having a first open end and an inner wall, said inner wall defining an interior, said first open end communicating with said interior, said interior being configured to receive therein at least a portion of an ear of corn; and a blade member having a blade and a handle, said blade having a first end and a second end and being movably mounted within said interior of said corn-receiving member, said handle being movably mounted at an exterior of said corn-receiving member, said blade being configured to move with said handle such that movement of said handle moves said blade, said blade being movable between a retracted position and an extended position, in said retracted position said blade member being inclined with respect to a longitudinal axis of said corn-receiving member such that said first end of said blade is located closer to said inner wall than is said second end of said blade, in said extended position said blade being configured to engage an ear of corn inserted into said interior and trap the ear of corn between said blade and said inner wall such that, as the ear of corn is rotated about a longitudinal axis within said interior, said blade tears open individual kernels of the ear of corn and allows liquid and fibrous contents of the kernels to drain into said interior of said corn-receiving member.

15. The device of claim 14, wherein said blade member has first and second mounting posts, and said corn-receiving member has first and second apertures formed therethrough, said each of said first and second mounting posts attached between said blade and said handle, said first mounting post extending through said first aperture, said second mounting post extending through said second aperture.

16. The device of claim 15, further comprising:

a biasing member arranged between the exterior of said corn-receiving member and a portion of said handle, said biasing member biasing said blade to said retracted position.

17. The device of claim 16, wherein said biasing member is a spring coiled about said first mounting post.

18. The device of claim 14, further comprising:

a container sized and shaped to receive liquid and fibrous contents of kernels of corn from said corn-receiving member.

19. The device of claim 18, wherein said corn-receiving member has a second open end and a first protrusion extending outwardly from the exterior of said corn-receiving member at a location closer to said second open end than said first open end, said second open end communicating with said interior, said first protrusion being configured to receive thereabout said container for receiving the liquid and fibrous contents of the kernels draining from said corn-receiving member via said second open end.

20. The device of claim 14, wherein said corn-receiving member has a stabilizing member affixed thereto, said stabilizing member extending outwardly from an exterior surface of said corn-receiving member and being shaped as a hook to engage a-surface such that, as an ear of corn is inserted into said corn-receiving member and rotated therein, engagement of said stabilizing member with the surface tends to stabilize said corn-receiving member.

* * * * *